(12) United States Patent
Qiu et al.

(10) Patent No.: US 7,990,683 B2
(45) Date of Patent: Aug. 2, 2011

(54) HIGH VOLTAGE SOLID ELECTROLYTIC CAPACITORS USING CONDUCTIVE POLYMER SLURRIES

(75) Inventors: Yongjian Qiu, Greenville, SC (US); Randy S. Hahn, Simpsonville, SC (US); Keith R. Brenneman, Simpsonville, SC (US)

(73) Assignee: Kemet Electronics Corporation, Greenville, SC (US)

( * ) Notice: Subject to any disclaimer, the term of this patent is extended or adjusted under 35 U.S.C. 154(b) by 170 days.

(21) Appl. No.: 12/116,614

(22) Filed: May 7, 2008

(65) Prior Publication Data

US 2008/0247121 A1    Oct. 9, 2008

Related U.S. Application Data (62) Division of application No. 11/481,764, filed on Jul. 6, 2006, now Pat. No. 7,563,290.

(51) Int. Cl.
*H01G 9/02* (2006.01)
*H01G 9/00* (2006.01)

(52) U.S. Cl. .......................... 361/525; 361/523
(58) Field of Classification Search .................. 361/523, 361/525
See application file for complete search history.

(56) References Cited

U.S. PATENT DOCUMENTS

| 4,780,796 | A | 10/1988 | Fukuda et al. ............. 361/433 |
| 4,910,645 | A | 3/1990 | Jonas et al. |
| 5,300,575 | A | 4/1994 | Jonas et al. |
| 5,457,862 | A | 10/1995 | Sakata et al. ............. 29/25.03 |
| 5,624,605 | A | 4/1997 | Cao et al. .................... 252/500 |
| 6,197,450 | B1 * | 3/2001 | Nathan et al. ............. 429/236 |
| 6,376,105 | B1 | 4/2002 | Jonas et al. |
| 6,391,379 | B1 | 5/2002 | Lessner et al. ............. 427/80 |
| 6,451,074 | B2 | 9/2002 | Bluvstein et al. ........... 29/25.03 |
| 6,635,729 | B1 | 10/2003 | Groenendaal et al. ....... 526/256 |
| 6,674,635 | B1 * | 1/2004 | Fife et al. .................... 361/523 |
| 6,798,644 | B1 | 9/2004 | Piller et al. ................ 361/528 |
| 6,804,109 | B1 | 10/2004 | Hahn et al. ................. 361/524 |
| 6,853,540 | B2 | 2/2005 | Kudoh et al. ............... 361/523 |
| 6,855,885 | B1 | 2/2005 | Schweikert ................ 174/50 |
| 6,867,473 | B2 | 3/2005 | Goodmer et al. ........... 257/516 |
| 6,987,663 | B2 | 1/2006 | Merker et al. |
| 7,379,290 | B2 * | 5/2008 | Toida et al. ................. 361/523 |
| 2004/0085711 | A1 * | 5/2004 | Merker et al. .............. 361/523 |
| 2004/0095708 | A1 * | 5/2004 | Takeda et al. .............. 361/504 |

(Continued)

FOREIGN PATENT DOCUMENTS

EP          0 899 757        3/1999

(Continued)

OTHER PUBLICATIONS

Kemet Tech Topics, vol. 5, No. 1, Mar. 1995, Dr. John Piper.

(Continued)

*Primary Examiner* — Eric Thomas
*Assistant Examiner* — David M Sinclair
(74) *Attorney, Agent, or Firm* — Joseph T. Guy; Nexsen Pruet, LLC (57) ABSTRACT

A method for forming a capacitor including forming an anode from a valve metal; forming an oxide on the anode to form an anodized anode; dipping the anodized anode into a slurry of conductive polymer; drying the intrinsically conductive polymer; and providing external terminations in electrical contact with the anode and the conductive polymer.

14 Claims, 5 Drawing Sheets

U.S. PATENT DOCUMENTS

| | | | |
|---|---|---|---|
| 2005/0248910 A1 | 11/2005 | Merker | 361/525 |
| 2005/0278915 A1* | 12/2005 | VanNatta et al. | 29/25.03 |
| 2006/0180474 A1* | 8/2006 | Fujimoto et al. | 205/213 |
| 2006/0236531 A1 | 10/2006 | Merker et al. | 29/746 |
| 2007/0064376 A1* | 3/2007 | Merker et al. | 361/528 |

FOREIGN PATENT DOCUMENTS

| | | | |
|---|---|---|---|
| JP | 11067603 A | * | 3/1999 |
| JP | 2001-102255 | | 4/2001 |

OTHER PUBLICATIONS

Impact of Circuit Resistance of Breakdown Voltage of Tantalum Chip Capacitors; Erik Reed and Jonathan Paulsen, 2001 Proceedings of Capacitor and Resistor Technology Symposium (CARTS) iin USA.

Derating Review of Ta—$MnO_2$ vs. Ta-Polymer vs. Al-Polymer vs. NbO—$MnO_2$; John D. Prymak. Paul Staubli and Mike Privallet, 2004 Proceedings of Capacitor and Resistor Technology Symposium (CARTS), Nice, France.

* cited by examiner

HIGH VOLTAGE SOLID ELECTROLYTIC CAPACITORS USING CONDUCTIVE POLYMER SLURRIES

CROSS-REFERENCE TO RELATED APPLICATIONS

This application is a divisional application of U.S. patent application Ser. No. 11/481,764 filed Jul. 6, 2006 now U.S. Pat. No. 7,563,290.

BACKGROUND

The present invention is related to an electrolytic capacitor. More specifically the present invention is related to an electrolytic capacitor comprising intrinsically conductive polymeric cathode layers capable of achieving high break down voltages which were not previously available with polymeric cathode layers.

Solid electrolytic capacitors with intrinsically conductive polymers as the cathode material have been widely used in the electronics industry due to their advantageous low equivalent series resistance (ESR) and "non-burning/non-ignition" failure mode. Intrinsically conductive polymer, more commonly known as conductive polymer, is electrically conductive in the molecular level, in other words, a single molecule (a polymer chain) of this type of polymer is conductive, which distinguishes itself from other groups of polymeric materials whose electrical conductivity is imported from the presence of foreign conductive particles. The example of the latter is polyester (non-conductive) filled with carbon back (conductive particles). The intrinsically conducting polymer can exist in many physical forms including solid, solution, and liquid dispersion.

The backbone of a conductive polymer consists of a conjugated bonding structure. The polymer can exist in two general states, an undoped, non-conductive state, and a doped, conductive state. In the doped state, the polymer is conductive but of poor processibility due to a high degree of conjugation along the polymer chain, while in its undoped form, the same polymer loses its conductivity but can be processed more easily because it is more soluble. When doped, the polymer incorporates anionic moieties as constituents on its positively charged backbone. In order to achieve high conductivity, the conductive polymers used in the capacitor must be in doped form after the completion of process, although during the process, the polymer can be undoped/doped to achieve certain process advantages.

Various types of conductive polymers including polypyrrole, polyaniline, and polyethyldioxythiophene are applied to the Ta capacitors. The major drawback of conductive polymer capacitors, regardless of the types of conductive polymers employed, is their relatively low working voltage compared to their $MnO_2$ counterparts. The polymer capacitors have reliability issues, to varying degrees, when the voltage rating exceeds 25V. This is believed to be caused by the relatively poor dielectric-polymer interface, which has poor "self-healing" capability. The ability to withstand high voltage can be best characterized by the breakdown voltage (BDV) of the capacitors. Higher BDV corresponds with better reliability. For reasons which were previously unknown the break down voltage of capacitors comprising conductive polymers has been limited to about 55V thereby leading to a capacitor which can only be rated for use at about 25V. This limitation has thwarted efforts to use conductive polymers more extensively.

In a manufacturing process to produce conductive polymer Ta capacitors, Ta powder is mechanically pressed to Ta metal pellets, which are subsequently sintered at high temperature under vacuum. The sintered anodes are then anodized in a liquid electrolyte at elevated temperature to form a cohesive dielectric layer ($Ta_2O_5$) on the anode surface. Increasing formation voltage increases the dielectric thickness, which determines the maximum voltage the anodes can withstand. The anodized anodes are then processed through multiple dipping cycles, which deposit conductive polymer onto the anode dielectric surface via in situ polymerization reactions. In the early stage of the coating process, reactant solutions are designed to gain easy access to the full surface area of the porous anodes without blocking the pores; while in the late stages, the coating process is designed to form a thick, dense external polymer layer, in order to protect the anodes from potential mechanical damages in the post polymerization process and from direct contact with graphite and silver layer, which are applied consequently onto the polymer coated anodes. The graphite/silver coated anodes are then assembled, molded, and tested to complete the manufacturing process.

For Ta capacitors, their rating voltage, or the working voltage allowed for reliable operation, is dictated by the dielectric thickness, which is controlled by the formation voltage. Increasing formation voltage increases the dielectric thickness. It is estimated that for every volt applied during the dielectric formation process, about 1.7~2 nm of dielectric is formed on the surface. For a given anode, increasing dielectric thickness is at a cost of capacitance loss since the anode capacitance is inversely proportional to dielectric thickness. It is a common practice for Ta capacitor manufacturers that the formation voltage of anodes is 2.5 to 4 times higher than the anode rated voltage to ensure high reliability during applications. For example, a 10V rated capacitor often employs an anode formed at 30V.

The major drawback of the existing conductive polymer technology is its limited ability to produce high voltage Ta capacitors. This is well illustrated in the products currently available in the market. For example, conductive polymer capacitors only can be rated at no more than 25V while their $MnO_2$ counterparts have ratings of greater than 50V.

Figure 1:
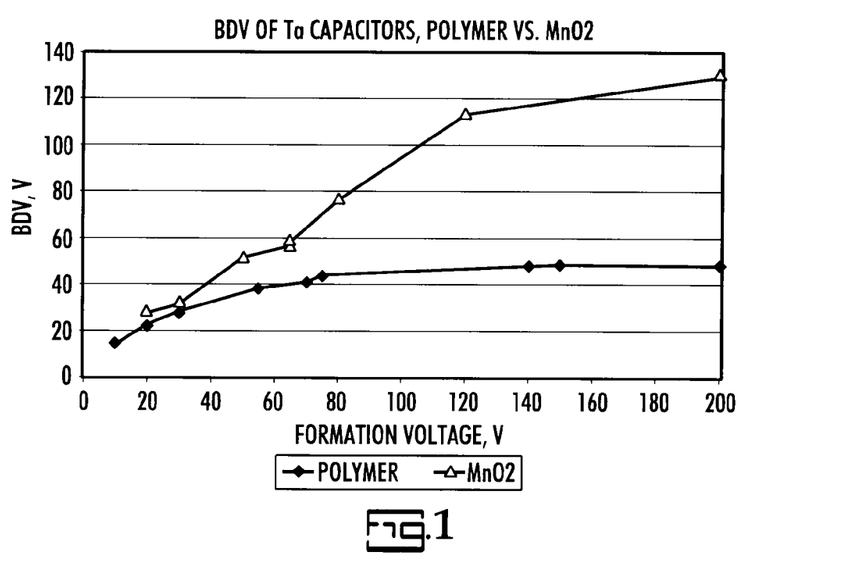
FIG. 1 illustrates graphically the break down voltage of capacitors comprising polymeric cathodes compared to the corresponding break down voltage for capacitors comprising $MnO_2$ cathodes.

A plot of the BDV versus the formation voltage for a wide range of Ta capacitors including both polymer (polyethyldioxythiophene, or PEDOT) and $MnO_2$ based capacitors is shown in FIG. 1.

As shown FIG. 1, in the low formation voltage region ($\leq 30V$), the BDV of both polymer and $MnO_2$ capacitors are close to the anode formation voltages. However, there is a trend of divergence in terms of BDV between $MnO_2$ and polymer capacitors as formation voltage increases from about 80V to 200V. In this range, while the BDV of $MnO_2$ parts still increase with the increasing formation voltage, the BDV of polymer parts shows a mostly flat pattern, which seems to hit a limit of about 50V and this limit is almost unaffected by the increasing formation voltage. Increasing dielectric thickness, which is the most important and commonly used approach to make high voltage capacitors, is virtually ineffective for making high voltage polymer capacitors beyond about 25V ratings. Due to this phenomenon the Ta industry has had difficulty producing reliable conducting polymer capacitors for use above 25V. A 35V rated capacitor, for example, would require a BDV of far greater than 50V to ensure its long term reliability (e.g. 35V rated $MnO_2$ parts have an average BDV of 115V). This also suggests that the dielectric in polymer capacitors degrades significantly under high electric field.

It is generally believed in the art that two major factors cause degradation of the dielectric. One factor is the presence of ionic species such as $Fe^{+2}$ and $Fe^{+3}$. $Fe^{+3}$ is the reactant (oxidant) of the polymerization reaction while $Fe^{+2}$ is the byproduct. It has been widely believed that the presence of such ionic species on the dielectric/polymer interface may cause dielectric breakdown under high electric field due to ionic migration. The other factor is based on the properties of conductive polymers themselves. Polymers are redox active meaning they can be reduced or oxidized. It has been widely believed that their redox properties influence the BDV of the dielectric/polymer interface.

We have investigated the impact of $Fe^{+2}$ and $Fe^{+3}$ on BDV by washing conductive polymer coated anodes in 1 wt % toluenesulfonic acid (TSA) solution for 24 hours. As shown in Table 1, while washing in TSA solution was effective in significantly reducing Fe residue content in the polymer covered anodes, the BDV of these washed anodes appeared unaffected relative to the control. Ammonium persulfate, or $(NH_4)_2S_2O_8$, was also employed to replace $Fe^{+3}$ as the oxidant, thereby eliminating any presence of Fe ions in the polymer. No improvement in BDV was observed.

TABLE 1

|  | Fe content, ppm | BDV, V |
| --- | --- | --- |
| Control | 90 | 55 |
| Washed | 6 | 55 |
| $(NH_4)_2S_2O_8$ as oxidant | — | 45 |

In further efforts to elucidate the impact of conductive polymer on BDV, the polymer was doped with iron (III) dodecylbenezenesulffiate (DBS) instead of iron (III) toluenebenezenesulfonate $(Fe(TS)_3)$. This approach produced polymers doped with DBS instead of toluenebenezenesulfonate. Likewise, $(NH_4)_2S_2O_8$ was used as the oxidant and the sodium salt of polystyrenesulfonate (PSS) was used as the dopant. In addition, polypyrrole (PPy) was pre-coated on the anodes followed by coating with PEDOT. This was designed to introduce a conductive polymer with redox properties that was different from those of PEDOT.

As shown in Table 2, the BDV of polymer anodes appeared unaffected by modifications in polymer properties or by altering the types of dopants in the conductive polymer

TABLE 2

|  | BDV, V |
| --- | --- |
| Control (TS as dopant) | 45 |
| PSS as dopant | 40 |
| DBS as dopant | 43 |
| PPy as precoat | 48 |

There has been a long standing desire in the art to provide a capacitor comprising a conducting polymeric cathode suitable for use at higher rated voltages. Artisans have long considered the iron content and polymer properties to be critical yet this has still led to failure. Through diligent research the present inventors have achieved what was previously not considered feasible.

SUMMARY OF THE INVENTION

It is an object of the invention to provide a capacitor comprising a conducting polymer with a high breakdown voltage.

It is another object of the invention to provide a method for forming a capacitor with a conducting polymer while maintaining a high breakdown voltage and low ESR.

These and other advantages, as will be realized, are provided in a method for forming a capacitor including forming an anode from a valve metal; forming an oxide on the anode to form an anodized anode; dipping the anodized anode into a slurry of conductive polymer; drying the intrinsically conductive polymer; and providing external terminations in electrical contact with the anode and the conductive polymer.

DETAILED DESCRIPTION OF THE INVENTION

Provided herein is an improved capacitor and method for making the improved capacitor. More particularly, provided herein is a capacitor comprising a conducting polymeric cathode with a break down voltage of over 60 V and ESR of no more than 150 mohms. This was previously considered unavailable to those of skill in the art.

The Invention will be described with reference to the various figures forming an integral part of the instant specification.

Figure 2:
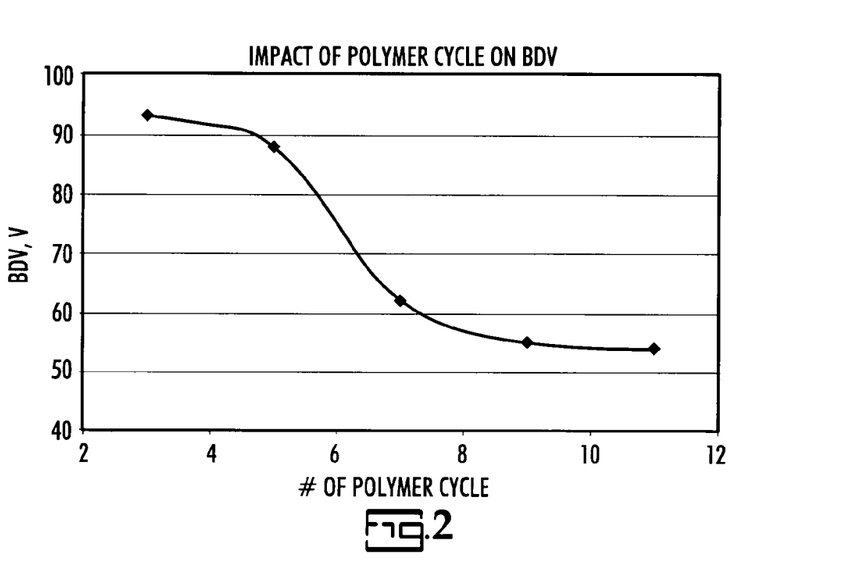
FIG. 2 illustrates graphically the impact of polymer cycle on break down voltage.

After analyzing the BDV behavior of a series of polymer coated anodes at various process stages, it was found that the BDV degrades as the polymer coating process progresses. This is contrary to the expectations of those skilled in the art. As shown in FIG. 2, for anodes formed at 130V, the BDV is about 93V after $3^{rd}$ polymer coating cycle, 88V after $5^{th}$ polymer cycle, 62V after $7^{th}$ cycle, and 54V after $11^{th}$ polymer cycle. Contrary to the understanding in the art this observation is unexpected since better coverage is expected to improve the layer integrity and therefore lead to a more stable capacitor. It appears that the in situ polymerization process may be responsible to the BDV degradation and it is now hypothesized that the in situ polymerization reaction, not the polymer product, affects the dielectric quality.

The generally accepted mechanism of in situ polymerization is shown in the following scheme:

It is generally agreed that M, the monomers, are to be oxidized to form charged radicals, M*, which then couple with each other to form dimers. The same process will lead to the formation of trimers, tetramers, oligomers, and eventually polymers. It is known that the radicals are of high energy and very reactive. It is now hypothesized that the radicals generated during the in situ reaction not only react with each other, but also react with $Ta_2O_5$, or the dielectric, by injecting electrons into it, thereby significantly degrading the dielectric performance. This hypothesis is illustrated in the following scheme:

Based on the now hypothesized reaction mechanism the dielectric degradation is caused by the interactions between high energy radicals and the dielectric. Dielectric degradation can't be avoided if an in-situ polymerization process is employed to make the polymer since the radicals are the intermediates of the polymer. In order to minimize the dielectric degradation, or to increase BDV, in situ polymerization processing should be minimized, or totally eliminated if possible. By the use of conductive polymer slurries, which are pre-made conductive polymers dispersed or partially dissolved in either aqueous or organic liquid media in prior to the coating process, the problems can be overcome Based on above new understanding, the technical challenge for capacitor manufacturers is how to impregnate the anodes with polymer to achieve expected performances, such as capacitance and ESR, while still forming a robust external polymer layer for anode protection with minimum involvement of in situ reactions. This has led to the unexpected realization that applying slurry containing pre-made intrinsically conducting polymer provides advantages not previously considered. It is most preferred that the polymer have a molecular weight of at least about 500 to no more than about 10,000,000. Below about 500 the polymer chains are of insufficient length to offer high conductivity and to form a coating with sufficient physical integrity. Above about 10,000,000 the polymeric chain is too large to form an adequate slurry.

The invention will be described with reference to the FIG. 7 forming a part of the present application.

Figure 7:
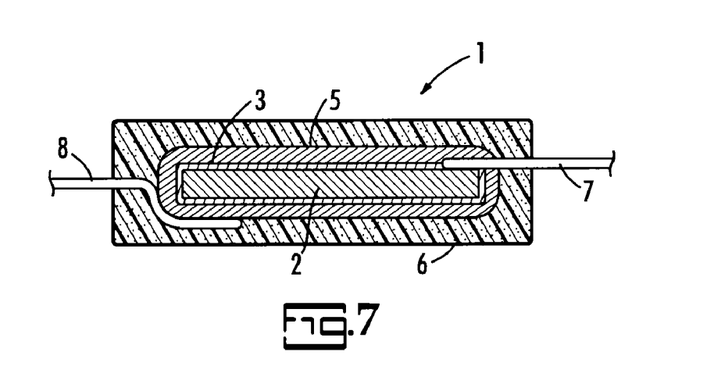
FIG. 7 illustrates a capacitor of the present invention.

In FIG. 7, a cross-sectional view of a capacitor is shown as represented at 1. The capacitor comprises an anode, 2, comprising tantalum. A dielectric layer, 3, is provided on the surface of the anode, 2. The dielectric layer is preferably formed as an oxide of tantalum as further described herein. Coated on the surface of the dielectric layer, 3, is a polymeric conducting layer, 5. Leads, 7 and 8, provide contact points for attaching the capacitor to a circuit. The entire element, except for the terminus of the leads, is then preferably encased in a housing, 6, which is preferably an epoxy resin housing.

The anode is typically prepared by pressing tantalum powder and sintering to form a compact. For convenience in handling, the valve metal is typically attached to a carrier thereby allowing large numbers of elements to be processed at the same time. Other valve metals and metal oxides such as aluminium, titanium, niobium, and niobium oxide may be employed as the anode material.

It is most desirable that the dielectric of the anode be an oxide of tantalum or of other valve metals. The oxide is preferably formed by dipping the valve metal into an electrolyte solution and applying a positive voltage to the valve metal.

Preferred electrolytes for formation of the oxide on the valve metal include diluted inorganic acids such as sulphuric acid, nitric acid, phosphoric acids, aqueous solutions of dicarboxylic acids, such as ammonium adipate. Other materials may be incorporated into the oxide such as phosphates, citrates, etc. to impart thermal stability or chemical or hydration resistance to the oxide layer.

The conductive polymer layer is preferably formed by dipping the anodized valve metal anodes into a slurry of intrinsically conductive polymer. It is preferred that the anode be dipped into the slurry from 1 to 15 times to insure formation of an adequate coating. The anode should remain in the slurry for a period about 0.5 minute to 2 minutes to allow complete slurry coverage of its surface.

In a less preferred embodiment the anode is initially impregnated with polymer formed in situ, then overcoated with polymer slurry. In the in-situ polymerization process, the anodized valve metal anode is dipped into an oxidant solution followed by dipping in liquid monomer or a solution of monomer. It is preferred that the anode be processed in the multiple process steps no more than 6 times. Above 6 process steps the BDV degrades significantly. Most preferably the anode is processed by the in situ polymerization process as few times as possible but not at the expense of insuring adequate polymer coverage and achieving low ESR. In practice two dips are typically sufficient and less than 6, is preferred.

A particularly preferred conducting polymer is illustrated in Formula I:

FORMULA 1

$R^1$ and $R^2$ of Formula 1 are chosen to prohibit polymerization at the β-site of the ring. It is most preferred that only α-site polymerization be allowed to proceed. Therefore, it is preferred that $R^1$ and $R^2$ are not hydrogen. More preferably $R^1$ and $R^2$ are α-directors. Therefore, ether linkages are preferable over alkyl linkages. It is most preferred that the groups are small to avoid steric interferences. For these reasons $R^1$ and $R^2$ taken together as —O—$(CH_2)_2$—O— is most preferred.

In Formula 1, X is S or N most preferable X is S.

$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R^3$ preferably represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl.

Both pure monomer and monomer solution in various solvents can be employed. Common oxidants including iron (III)

toluenesulfonate, hydrogen peroxide, and ammonium persulfate are preferred to be used in the polymerization process.

As typically employed in the art, various dopants can be incorporated into the polymer during the polymerization process. Dopants can be derived from various acids or salts, including aromatic sulfonic acids, aromatic polysulfonic acids, organic sulfonic acids with hydroxy group, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121 which is included herein by reference thereto.

Binders and cross-linkers can be also incorporated into the conductive polymer layer if desired. Suitable materials include poly(vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones, and pyrrole/acrylate, vinylacetate/acrylate and ethylene/vinyl acetate copolymers.

Carbon paste layers and silver paste layers are formed for attaching electrode leads as known in the art. The device is then sealed in a housing.

Other adjuvants, coatings, and related elements can be incorporated into a capacitor, as known in the art, without diverting from the present invention. Mentioned, as a non-limiting summary include, protective layers, multiple capacitive levels, terminals, leads, etc.

EXAMPLES

Figure 3:
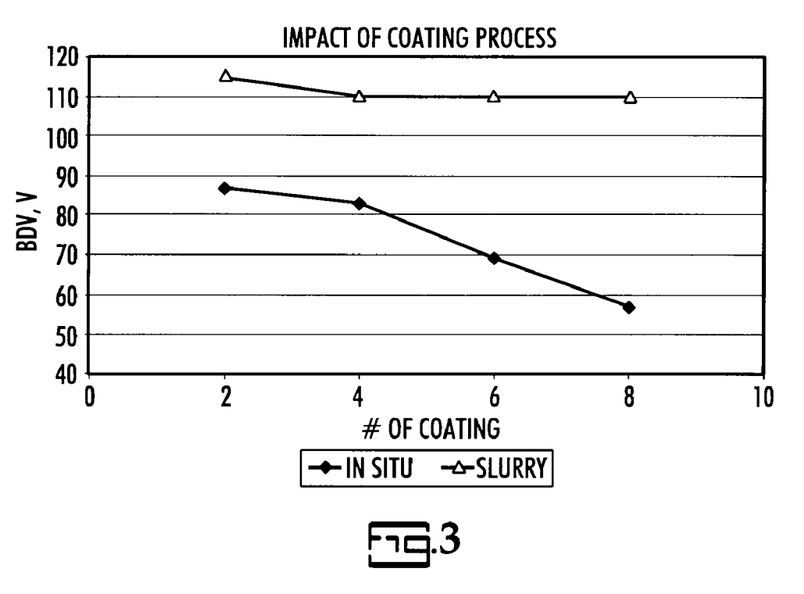
FIG. 3 illustrates graphically the impact of the coating process on break down voltage.

One group of 15 uF-25V anodes was processed through various in situ polymerization cycles and the other group from the same batch was coated with polymer slurry. As shown in FIG. 3, the slurry coated anodes retain their high BDV throughout the process without any degradation while the BDV of its in situ polymerized counterpart degrades. It can also be derived from the results that relatively high BDV of in situ polymerized anodes can be achieved by limiting the process cycles applied.

Our recent discovery that the use of conductive polymer slurries, including polyaniline (PANI) and polyethyldioxythiophene (PEDOT), leads to a significant increase in BDV. It is believed that the current in-situ polymerization process degrades the dielectric insulating properties by injecting electrons via free radicals, which are parts of the intermediates of the polymerization reactions. The dielectric layer becomes less stable by accepting these electrons. Applying polymer slurry onto the dielectric instead of forming a polymer coating in situ eliminates the exposure of the dielectric to the high energy radicals generated during the polymerization reaction, thereby minimizing dielectric degradation during multiple polymer coating process steps.

Figure 4:
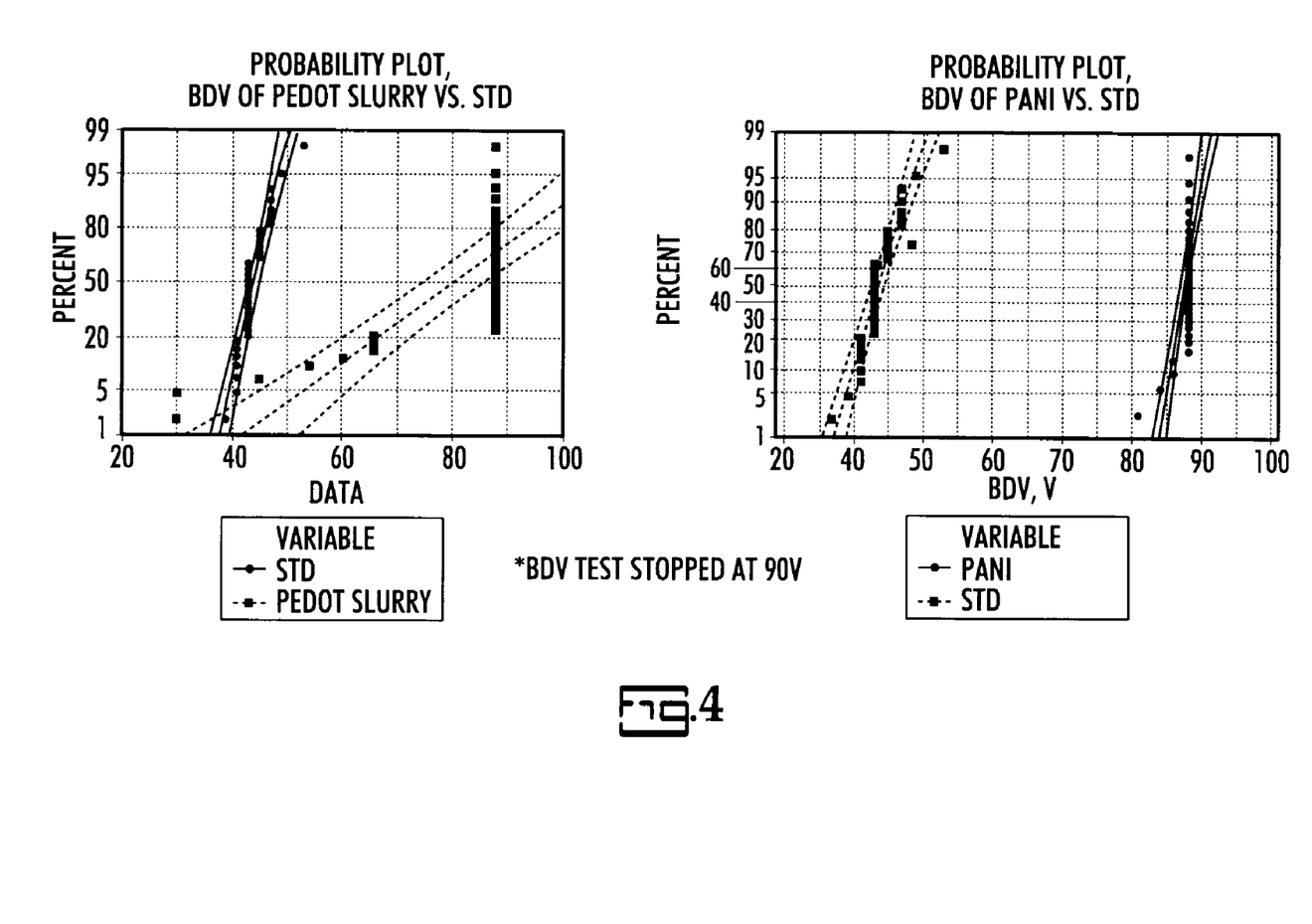
FIG. 4 illustrates the breakdown voltage of polymer anodes using PEDOT and PANI slurries.

FIG. 4 compares the BDV of 25V-rated anodes processed using various processes. Anodes processed using current in situ polymerization of PEDOT process (control) were evaluated vs. anodes with two initial PEDOT coatings and subsequently coated with either PANI slurry or PEDOT slurry. As shown in FIG. 4, the increase in BDV using polymer slurries is significant.

Figure 5:
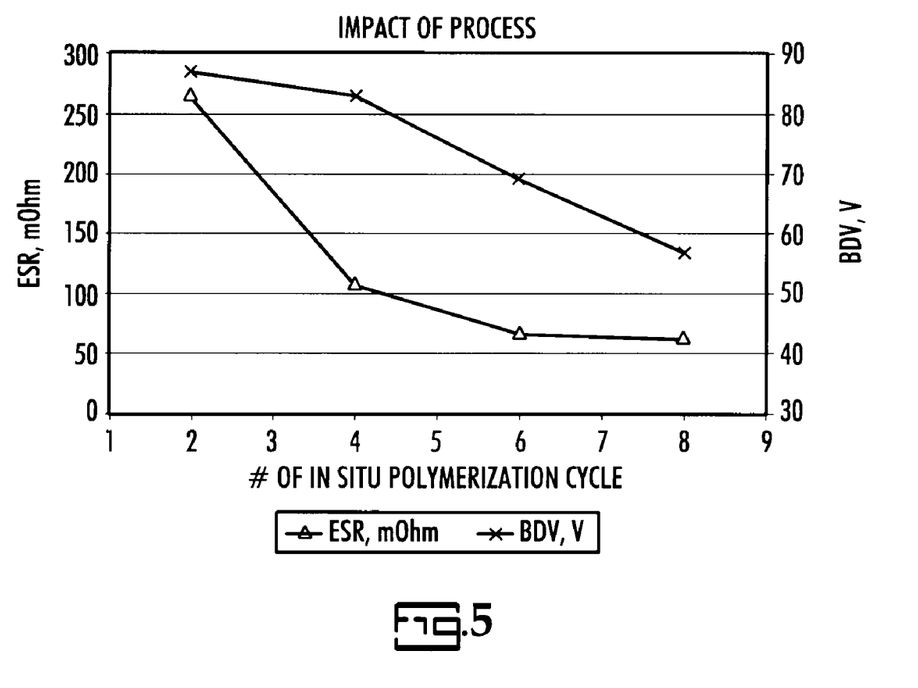
FIG. 5 illustrates the impact of processing steps on break down voltage and ESR.

FIG. 5 co-plots the ESR and BDV versus the number of in situ polymerization process cycles, which impregnates the anodes in order to obtain the desired ESR and capacitance properties. Lower ESR and higher BDV are both desirable, however, ESR reduction is often achieved at the expense of lower BDV. The process should be optimized for balancing this conflict to achieve low ESR without causing significant BDV degradation. For example, by applying 4 coating cycles the anode BDV can be maintained at 85V with an ESR of 50 mOhm, which is still considered good by industry standard.

Figure 6:
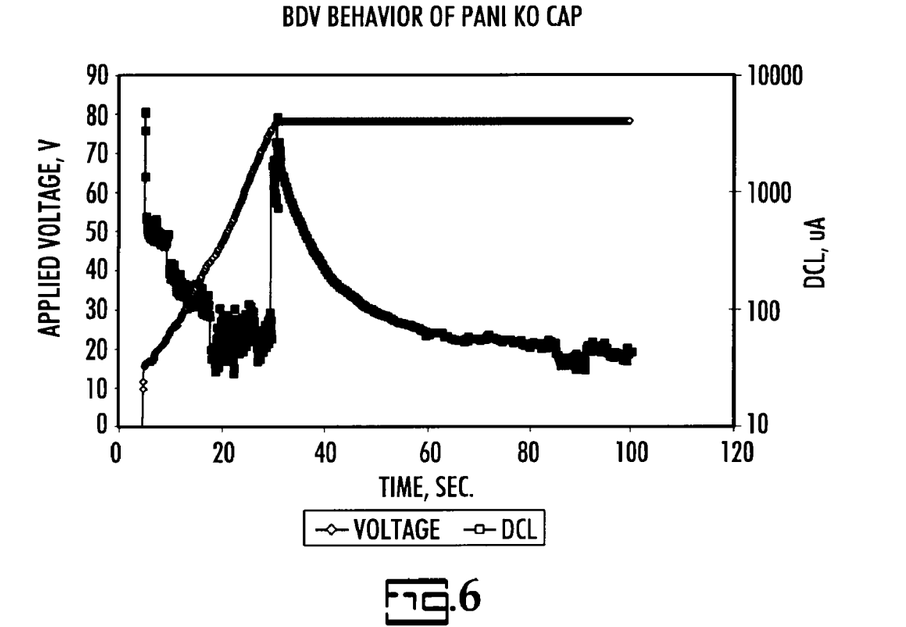
FIG. 6 illustrates the break down voltage of an anode coated with a PANI slurry.

FIG. 6 shows the breakdown behavior of the anode coated with PANI slurry. The current passed through the anodes decreased as the anode was charged with increasing applied voltage. A current spike at about 78V indicated the partial breakdown of the dielectric. However, the consequent drop of the current under constant voltage showed that the damaged dielectric was gradually "healed," demonstrating the excellent "self-healing" capability of the intrinsically conducting polymer cathode.

Comparative Example

A 15 uF tantalum anode with a size of (4.90 mm×3.25 mm×1.70 mm) was dipped into a solution of iron (III) toluenesulfonate (oxidant) for 1 minute and sequentially dipped into ethyldioxythiophene (monomer) for 1 minute. The anodes were washed to remove excess monomer and by products of the reactions after the completion of 60 minutes polymerization, which formed a thin layer of conductive polymer (PEDOT) on the dielectric of the anodes. This process was repeated 10 times. The anodes were tested for BDV and other electrical properties after the anodes were coated with graphite and silver. The test results are listed in the following Table 3.

Example 1

A 15 uF tantalum anode with a size of (4.90 mm×3.25 mm×1.70 mm) was dipped into a solution of ion (III) toluenesulfonate (oxidant) for 1 minute and sequentially dipped into ethyldioxythiophene (monomer) for 1 minute. The anodes were washed to remove excess monomer and by products of the reactions after the completion of 60 minutes polymerization, which formed a thin layer of conductive polymer (PEDOT) on the dielectric of the anodes. This process was repeated 6 times. The anodes were then dip-coated twice using a PEDOT slurry to form a thick external polymer layer. Graphite and Ag coating was applied onto the anodes after the conductive polymer slurry on the anodes was dried. The anodes were tested for BDV and other electrical properties. The test results are listed in the following Table 3.

Example 2

A 15 uF tantalum anode with a size of (4.90 mm×3.25 mm×1.70 mm) was dipped into a solution of ion (III) toluenesulfonate (oxidant) for 1 minute and sequentially dipped into ethyldioxythiophene (monomer) for 1 minute. The anodes were washed to remove excess monomer and by products of the reactions after the completion of 60 minutes polymerization, which formed a thin layer of conductive polymer (PEDOT) on the dielectric of the anodes. This process was repeated 2 times. The anodes were then dip-coated twice using a polyaniline (PANI) slurry to form a thick external polymer layer. Graphite and Ag coating was applied onto the anodes after the conductive polymer slurry on the anodes was dried. The anodes were tested for BDV and other electrical properties. The test results are listed in the following Table 3.

Example 3

A 15 uF tantalum anode with a size of (4.90 mm×3.25 mm×1.70 mm) was dipped into a diluted PEDOT slurry for 1 minute and dried at 120° C. for 20 minutes. This process was repeated 5 times. The anodes were then dip-coated three times using a PEDOT slurry to form a thick external polymer layer. Graphite and Ag coating was applied onto the anodes after the conductive polymer slurry on the anodes was dried. The anodes were tested for BDV and other electrical properties. The test results are listed in the following Table 3.

TABLE 3

| Type | Cap, uF* | DF, %* | ESR, mOhm** | BDV, V*** |
|---|---|---|---|---|
| Comparative example | 15.8 | 1.7 | 45 | 45 |
| Example 1 | 15.3 | 1.8 | 50 | >80 |
| Example 2 | 15.2 | 2 | 110 | 70 |
| Example 3 | 15 | 1.7 | 100 | >100 |

*Capacitance and DF were measured at 120 Hz.
**ESR was measured at 100K Hz.
***BDV measured using 3 V voltage step increment with 30 seconds hold time. BDV is defined as the voltage at which the leakage current of an anode reaches 1 mA.

This invention has been described with particular reference to the preferred embodiments without limit thereto. One of skill in the art would realize additional embodiments and alterations without deviating from the scope of the invention which is more particularly set forth in the claims appended hereto.

The invention claimed is:

1. A capacitor formed by the method of:
forming an anode from a valve metal;
forming a dielectric layer on said anode to form a dielectric coated anode;
coating said dielectric coated anode with a slurry of intrinsically conductive polymer;
drying said intrinsically conductive polymer;
providing terminations in electrical contact with said anode and said intrinsically conductive polymer; and wherein said capacitor has a breakdown voltage of at least 60V wherein said capacitor has a breakdown voltage to formation voltage ratio of at least 0.46.

2. The capacitor of claim 1 wherein said capacitor has a breakdown voltage to formation voltage ratio of at least 0.54.

3. A capacitor formed by the method of:
forming an anode from a valve metal;
forming a dielectric layer on said anode to form a dielectric coated anode;
coating said dielectric coated anode with a slurry of intrinsically conductive polymer;
drying said intrinsically conductive polymer;
providing terminations in electrical contact with said anode and said intrinsically conductive polymer; and wherein said capacitor has a breakdown voltage of at least 60V wherein said capacitor has an anode with a volumetric efficiency of at least 555 µF/cc.

4. The capacitor of claim 3 wherein said capacitor has an anode wherein the product of volumetric efficiency and break down voltage is at least 33,300 V·µF/cc.

5. A capacitor formed by the method of:
forming an anode from a valve metal;
forming a dielectric layer on said anode to form a dielectric coated anode;
coating said dielectric coated anode with a slurry of intrinsically conductive polymer;
drying said intrinsically conductive polymer;
providing terminations in electrical contact with said anode and said intrinsically conductive polymer;
prior to said dipping processing said dielectric coated anode in at least one in-situ polymerization cycle wherein said capacitor has a breakdown voltage of at least 60V wherein said capacitor has a breakdown voltage to formation voltage ratio of at least 0.46.

6. A capacitor formed by the method of:
forming an anode from a valve metal;
forming a dielectric layer on said anode to form a dielectric coated anode;
coating said dielectric coated anode with a slurry of intrinsically conductive polymer;
drying said intrinsically conductive polymer;
providing terminations in electrical contact with said anode and said intrinsically conductive polymer;
prior to said dipping processing said dielectric coated anode in at least one in-situ polymerization cycle wherein said capacitor has a breakdown voltage of at least 60V wherein said capacitor has a breakdown voltage to formation voltage ratio of at least 0.54.

7. A capacitor formed by the method of:
forming an anode from a valve metal;
forming a dielectric layer on said anode to form a dielectric coated anode;
coating said dielectric coated anode with a slurry of intrinsically conductive polymer;
drying said intrinsically conductive polymer;
providing terminations in electrical contact with said anode and said intrinsically conductive polymer;
prior to said dipping processing said dielectric coated anode in at least one in-situ polymerization cycle wherein said capacitor has a breakdown voltage of at least 60V wherein said capacitor has an anode with a volumetric efficiency of at least 555 µF/cc.

8. The capacitor of claim 7 wherein said capacitor has an anode wherein the product of volumetric efficiency and break down voltage is at least 33,300 V·µF/cc.

9. A capacitor formed by the method of:
forming an anode from a valve metal;
forming a dielectric layer on said anode to form a dielectric coated anode;
coating said dielectric coated anode with a slurry of intrinsically conductive polymer;
drying said intrinsically conductive polymer; and
providing terminations in electrical contact with said anode and said intrinsically conductive polymer wherein said capacitor has a breakdown voltage from 60V to 120V wherein said capacitor has a breakdown voltage to formation voltage ratio of at least 0.46.

10. The capacitor of claim 9 wherein said capacitor has a breakdown voltage to formation voltage ratio of at least 0.54.

11. A capacitor formed by the method of:
forming an anode from a valve metal;
forming a dielectric layer on said anode to form a dielectric coated anode;
coating said dielectric coated anode with a slurry of intrinsically conductive polymer;
drying said intrinsically conductive polymer; and
providing terminations in electrical contact with said anode and said intrinsically conductive polymer wherein said capacitor has a breakdown voltage from 60V to 120V wherein said capacitor has an anode with a volumetric efficiency of at least 555 µF/cc.

12. The capacitor of claim 11 wherein said capacitor has an anode wherein the product of volumetric efficiency and break down voltage is at least 33,300 V·µF/cc.

13. A capacitor formed by the method of:
forming an anode from a valve metal selected from tantalum and niobium;
forming a dielectric layer on said anode to form a dielectric coated anode;
dipping said dielectric coated anode into a slurry of intrinsically conductive polymer;
drying said intrinsically conductive polymer;
providing terminations in electrical contact with said anode and said intrinsically conductive polymer; and
wherein said capacitor has a breakdown voltage of at least 60V, and a breakdown voltage to formation voltage ratio of at least 0.46 and said anode has a product of volumetric efficiency and break down voltage which is at least 33,300 V·µF/cc.

14. The capacitor of claim 13 wherein said breakdown voltage to formation voltage ratio is at least 0.54.

* * * * *